(12) United States Patent
Drayton et al.

(10) Patent No.: US 8,375,329 B2
(45) Date of Patent: Feb. 12, 2013

(54) METHOD OF PROVIDING A GRAPHICAL USER INTERFACE USING A CONCENTRIC MENU

(75) Inventors: David Samuel Drayton, Mannheim (DE); Bernd Franz Lutz, Darmstadt (DE); Marco Tillmann, Niddatal (DE)

(73) Assignee: Maxon Computer GmbH, Friedrichsdorf (DE)

( * ) Notice: Subject to any disclaimer, the term of this patent is extended or adjusted under 35 U.S.C. 154(b) by 107 days.

(21) Appl. No.: 12/552,055

(22) Filed: Sep. 1, 2009

(65) Prior Publication Data

US 2011/0055760 A1    Mar. 3, 2011

(51) Int. Cl.
    *G06F 3/048* (2006.01)
(52) U.S. Cl. .......................... 715/834; 715/767; 715/815
(58) Field of Classification Search .................. 715/834, 715/815, 767
    See application file for complete search history.

(56) References Cited

U.S. PATENT DOCUMENTS

| | | | | |
|---|---|---|---|---|
| 4,730,186 A * | 3/1988 | Koga et al. ..................... 345/179 |
| 5,623,612 A * | 4/1997 | Haneda et al. ................. 715/856 |
| 5,664,132 A * | 9/1997 | Smith ............................ 715/834 |
| 5,828,360 A * | 10/1998 | Anderson et al. ............. 715/834 |
| 6,144,378 A * | 11/2000 | Lee ................................ 715/767 |
| 6,448,987 B1 * | 9/2002 | Easty et al. .................... 715/834 |
| 6,549,219 B2 * | 4/2003 | Selker ........................... 715/834 |
| 6,973,200 B1 * | 12/2005 | Tanaka et al. ................. 382/103 |
| 7,701,445 B2 * | 4/2010 | Inokawa et al. ............... 345/173 |
| 2005/0162395 A1 * | 7/2005 | Unruh ........................... 345/169 |
| 2007/0256029 A1 * | 11/2007 | Maxwell ....................... 715/834 |
| 2009/0254864 A1 * | 10/2009 | Whittington et al. ......... 715/834 |
| 2010/0185985 A1 * | 7/2010 | Chmielewski et al. ....... 715/834 |
| 2010/0192101 A1 * | 7/2010 | Chmielewski et al. ....... 715/834 |
| 2010/0192102 A1 * | 7/2010 | Chmielewski et al. ....... 715/834 |
| 2010/0333030 A1 * | 12/2010 | Johns ............................ 715/834 |

\* cited by examiner

*Primary Examiner* — Phenuel Salomon
(74) *Attorney, Agent, or Firm* — Andrew Wilford

(57) ABSTRACT

In a graphical user interface a display is animated by activation with an input device with a first concentric menu comprising a first grouping of menu items having a subset of one or more items from a set of menu items. Then, after selecting one menu item out of the first grouping of menu items, the display is animated with at least one additional grouping of menu items that are each concentrically in a pie sliced shape. The graphical user interface can be activated by a user at any position on the display area via the input device.

18 Claims, 4 Drawing Sheets

METHOD OF PROVIDING A GRAPHICAL USER INTERFACE USING A CONCENTRIC MENU

FIELD OF THE INVENTION

The present invention generally relates to the field of graphical user interfaces (GUIs), and more particularly, to a method of providing a GUI using user-specific animated concentric menus, which are organized in a pie sliced shape, wherein the main menu is organized in the innermost parts of the concentric menu and the sub-menus are located in the outer parts of the same pie slice shaped menu part.

BACKGROUND OF THE INVENTION

Since actual software programs implicate a continuously increasing number of functions for the user, graphical user interfaces (GUIs), such as icons, cursors, pop-up windows, and is menus are of great importance to allow a comfortable interaction of the user with the software program. Current desktop GUIs typically provide one or more drop-down or pop-up menus and a large number of icons to select specific functions. Traditional menu systems are arranged in a top-to-bottom linear configuration, where the menu items are logically arranged or similar functions are arranged groupwise. Especially, when the list of menu items gets very long, it becomes difficult for the user to quickly review the list and even more difficult to recall from prior selections the exact position of specific menu items. The drop-down menus are often nested several layers deep. Each nested layer of the menu structure is usually displayed as a separate drop-down menu in a rectangular shape that is visually connected to the previous layer of the menu structure. When choosing an option from such a drop-down menu, the cursor has to be moved over a path substantially corresponding to the horizontal or vertical lines along which the options are arranged. In the case that a graphics tablet is used as an input device to manipulate the software these precise movements for navigating through a menu structure are very difficult to fulfill even for an expert user.

To facilitate the navigation within GUIs, an alternative user-interface technique was developed, the so-called "pie" menus, which are two-dimensional and much easier to use and faster than conventional linear menus. Especially for the usage with alternative pointing devices as data-tablets or touchscreens, this special menu structure allows a quick navigation through the different menu layers. The pie menus are round menus, wherein the menu items are positioned around the center. The target regions are shaped like the slices of a pie, and the cursor starts in the center of the menu in an inactive region. The active regions are all adjacent to the cursor, but each in different directions (Don Hopkins, Dr. Dobb's Journal, December 1991). Most known pie menus only contain one menu layer with selectable menu items. Therefore, a limited number of menu functions can be accessed using such a menu structure. Alternatively, after selection of a menu item, a second menu, which can be either a linear menu or a further circular menu, appears (Kurtenbach & Buxton, Proceedings of InterCHI '93, 1993, 482-487). These structures are complicated, require wide movements of the cursor and cannot be navigated intuitively.

OBJECT OF THE INVENTION

It is therefore an object of the present invention to provide a method and system for providing a GUI, wherein a grouping of frequently used menu items is arranged in a first concentric menu, which can easily be accessed at a user-defined location on the working space. After selection of a menu item out of the first concentric menu, the display of at least one additional grouping of menu items is animated, each of the additional groupings formed concentrically in a pie sliced shape. Another objective of the present invention is to provide a machine readable medium storing instructions for realizing the method of providing a GUI.

SUMMARY OF THE INVENTION

According to the present invention, a method and system for providing a GUI is provided, wherein the central portion of the GUI is displayed, after activation via an input device. Subsequently, the display of a first concentric menu comprising a first grouping of menu items and comprising a subset of one or more items from a set of menu items is animated. This subset of menu items can be selected by the user based on importance, including any of frequency of use, popularity, historical favorites and can be positioned based on a relationship between individual items. After selection of one menu item out of the first grouping of menu items, the display of at least one additional grouping of menu items is animated, each of the additional groupings of menu items formed concentrically in a pie sliced shape. These additional groupings of menu items can correspond to sub-menus of the selected menu item of the first grouping of menu items, the subset of items being selectable by the user based on importance, including any of frequency of use, popularity, historical favorites and positioned based on a relationship between individual items. This GUI can be activated by a user at any position on the display area via an input device, when it is needed. The pie menu can either have a hierarchical structure where every menu level corresponds to sub-menus of the level before or have a non-hierarchical structure, where the single menu items are independent from one another. The present invention further provides a machine readable medium storing instructions for implementing the above-described method and system for providing a GUI.

DETAILED DESCRIPTION OF THE PREFERRED EMBODIMENTS

The present invention will now be described with reference to the accompanying drawings which show specific embodiments of the GUI by which the invention may be practiced. The present disclosure is considered as an exemplification of the principles of the invention and the associated functional specifications and is not intended to limit the scope of the invention to the embodiments illustrated. Those skilled in the art will envision many other possible variations of the concentric menu within the scope of the present invention.

Figure 1:
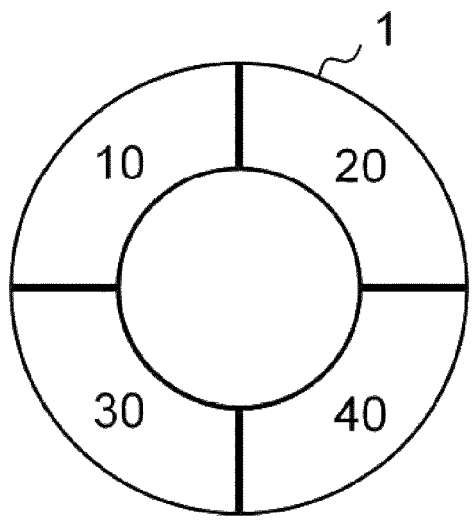
FIG. 1 illustrates an embodiment of a first concentric menu.

FIG. 1 illustrates an embodiment of the first concentric menu. A first grouping of menu items 1 is displayed in a circular arrangement, comprising a subset of items 10, 20, 30 and 40 from a set of menu items. Throughout the drawings, menu items are labeled as numerals; however these numerals are implemented as text, icons or other symbols frequently used as menu items. In the FIG. 1 configuration, the menu items of greater importance are placed in the first grouping of menu items 1. By default, it may be convenient to place the most important menus within this first grouping of menu items 1, which allow direct access to the most frequently used menus in an application. Alternatively it may be feasible to arrange the menu items based on highest popularity or highest frequency of use based on historical analysis. In a specific embodiment, the user can chose which menu items are to be displayed in this first grouping of menu items. It depends on which operations a user wants to perform when using the software and which commands he or she has to use frequently, so that every user can individually adjust the GUI, perhaps only for a limited time, when performing specific operations, to meet his/her requirements. The GUI is designed in such way that it can be activated via an input device at any location in the display area. When the user activates the GUI, it will appear directly below or in close proximity to the actual cursor position. This has the advantage that for example the manipulation of a graphic object can be performed directly on the object and it is not required to move the cursor away from the manipulated graphic object to a taskbar and to navigate through a nested menu structure and then to move the cursor back to the manipulated object.

Figure 2:
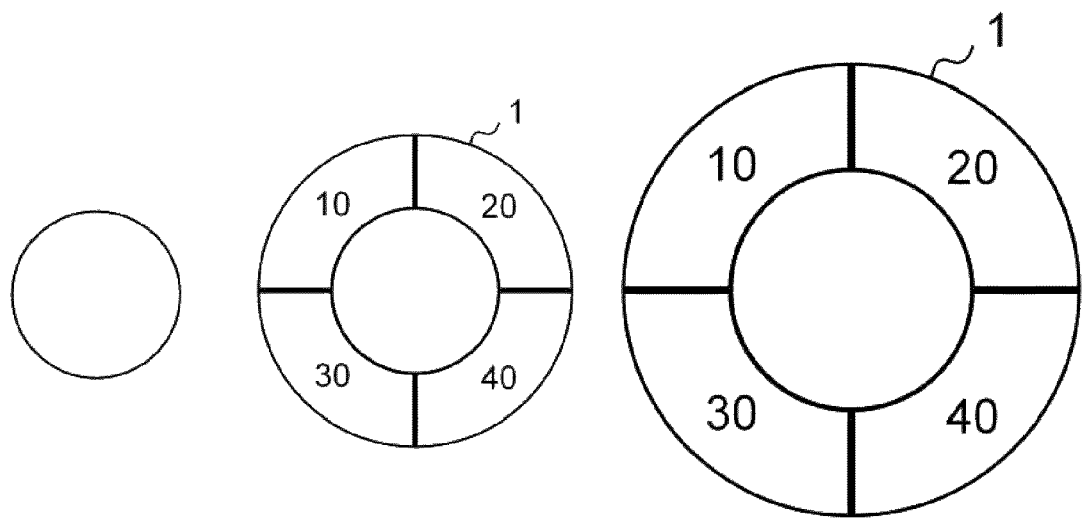
FIG. 2 illustrates exemplary frames for the animation of the first concentric menu.

FIG. 2 illustrates exemplary frames for the animation of the first concentric menu. After activating the GUI via the input device, the animation of the menu starts in the central portion of the GUI at the desired place on the working space, which can be directly below or in close proximity to the actual curser position. In a next step the display of the first grouping of menu items 1 is animated, comprising a subset of items 10, 20, 30 and 40 from a set of menu items. In this embodiment the first grouping of menu items appears surrounding the central portion and is then increasing in size until reaching its final state. In a further alternative embodiment of the present invention the user can manipulate the parameters of animations, such as the speed, the transparency of the concentric menu and the size of the final concentric menu. By varying the transparency of the concentric menu, it is possible to work with the GUI directly on a graphical object and still seeing the details of this object.

After animation of the display of the first concentric menu, the user can select one menu item out of the first grouping of menu items. The individual menu item can be selected by activation via the input device or preferably by positioning the cursor on the specific menu item. In this case, the navigation through the GUI is achieved just by moving the cursor over the desired menu items. The selection of a specific menu item occurs then by activation via the input device. In contrast to conventional GUIs, every menu item is used for structuring the GUI and a specific function can be accessed by activation via the input device. The selection of one menu item out of the first grouping of menu items results in the animation of the display of at least one additional grouping of menu items. Each of the additional groupings of menu items is formed concentrically and sequentially in a pie sliced shape or array. The presentation of those additional groupings of menu items depends on the basic structure of the menu, which may be hierarchical or non-hierarchical.

Figure 3:
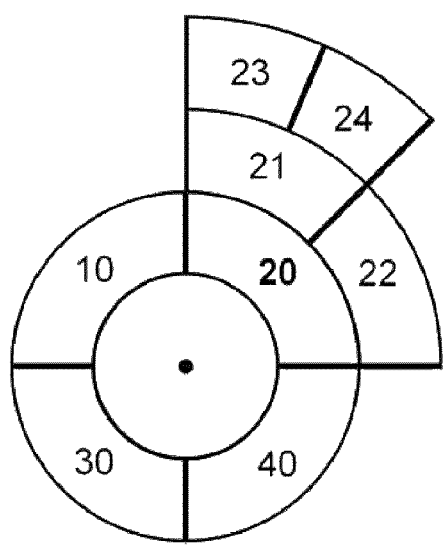
FIG. 3 illustrates an embodiment of a hierarchical concentric menu with a pie slice shaped sub-menu.

FIG. 3 illustrates an embodiment of a hierarchical concentric menu with a pie slice shaped sub-menu. In this example, the level 1 menu item 20 is selected and two additional groupings of menu items (level 2 and level 3) are displayed. In this specific embodiment, the level 2 menu items 21 and 22 correspond to sub-menus of the selected level 1 menu item 20. The level 3 menu items 23, 24 correspond to sub-menus or selectable functions of the level 2 menu item 21. After selection of the level 2 menu item 21 only the sub-menus of this menu item are displayed (23, 24), the sub-menus of the menu item 22 are not shown. It can be favorable that every menu level within this hierarchical menu structure is displayed sequentially and the level 3 menu items are just displayed after selection of a menu item out of the level 2 menu items. This GUI has the advantage that only the sub-menus of the selected first menu item 20 are displayed. Since the sub-menus 21, 22 and 23, 24 are located within one circular sector together with the level 1 menu item; the user only has to move the cursor in one direction in one flow. It is not necessary to move the cursor along a nested drop-down menu in horizontal and vertical directions, following the path of the selected items and paying attention not to lose the path by dropping with the cursor in a wrong line.

Figure 4:
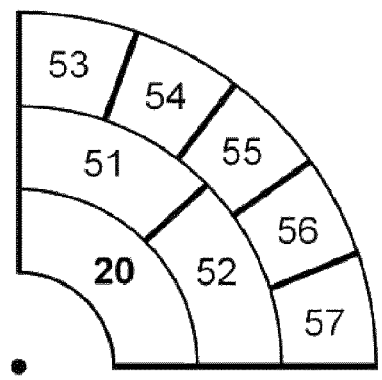
FIG. 4 illustrates an embodiment of a non-hierarchical concentric menu with a pie slice shaped sub-menu.

In FIG. 4, an alternative preferred embodiment is displayed, where the additional groupings of menu items (level 2 and level 3) do not correspond to sub-menus of the selected level 1 menu item. In this case, each sector of menu items corresponds to one sub-grouping of menu items. When a level 1 menu item is selected, the complete sector with all menu items is displayed. The most frequently used menu items can be displayed in the inner part of the circular sector and menu items, which are not used with a high frequency are located in the outer parts of the circular sector. In this embodiment, the menu does not have any hierarchical structure; the level 2 menu items 51 and 52 can be independent from the level 3 menu items 53, 54, 55, 56 and 57. The user can chose, which menu functions he/she frequently uses and arrange those menu items within the circular GUI. To have a raw structuring, it can be preferred to arrange similar menu items in one circular sector. This enables the user to quickly gain access to the desired menu items. Furthermore it may be favorably to create mixed menu structures, which combine hierarchical elements with non-hierarchical structures.

In a further preferred embodiment, the first concentric menu comprises four level 1 menu items 10, 20, 30 and 40, so that the selected menu item together with the corresponding sub-menus of the selected menu item form a quadrant, as depicted in the figures. The division into four quadrants is intuitive, since various objects are arranged in a four-fold symmetry, e.g. the four cardinal points, or the division of the surrounding of an object in front, back, left and right. When the first concentric menu does not consist of too many items, it is easier for the user to remember the position of the single menu items. The menu items are relatively large, so that it is easy for the user to select one menu item. Especially for tablet users it is important that the functions of the GUI are easy to reach and the menu items are large enough so that they are selectable quickly. In this embodiment, the sub-menus of the selected first menu item are arranged in one quadrant, and the position of the single menu items can easily be remembered.

In an alternative variation, the non-selected level 1 menu items from the first concentric menu are animated to fade away as illustrated in FIG. 4, or to fade until a certain transparency is reached. The faded menu items can be reanimated by moving the cursor over the desired menu item. When the user has for example chosen a wrong level 1 menu item, this allows him/her to quickly select another level 1 menu item. This variation reduces the GUI drastically, since only the menu items are depicted, which are currently important and can be selected by the user. Therefore, the user knows exactly, which level 2 menu items can be chosen 51 or 52 without being distracted by further menu items 10, 30 and 40.

Figure 5:
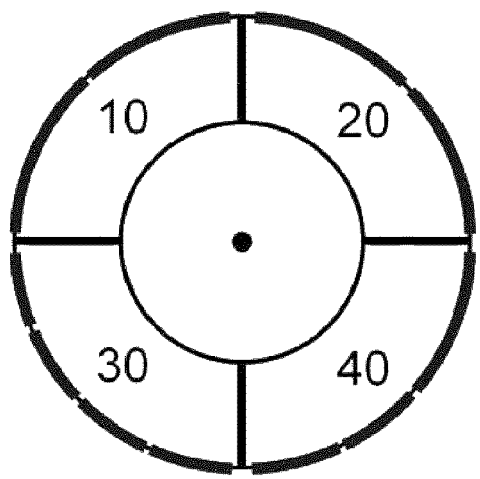
FIG. 5 illustrates another embodiment of the concentric menu, where the number of second level menu items is already implicated at the border of the first concentric menu.

FIG. 5 shows another alternative embodiment of the concentric menu, where the number of level 2 menu items is already implicated at the border of the first concentric menu. In this embodiment, thick lines at the border of the level 1 menu items implicate the number of level 2 menu items before having selected a specific level 1 menu item. This is indicated by thick broken lines at the outer border of each level 1 menu item. As depicted in FIG. 5, the user knows before selecting a level 1 menu item that two level 2 menu items correspond to each of the menu items 10 and 20, and four and three level 2 menu items correspond to the menu items 30 and 40, respectively. If the user remembers for example that the menu he wants to activate has four level 2 menu items, he knows that the menu items 10 and 20 cannot be the right ones, since they both only have two level 2 menu items. The display of the next level menu items is not limited to thick broken lines at the border of the menu items. Alternatively, the number of menu items in the next menu level can be visualized by different colors, labeling or animations within the menu items.

Figure 6:
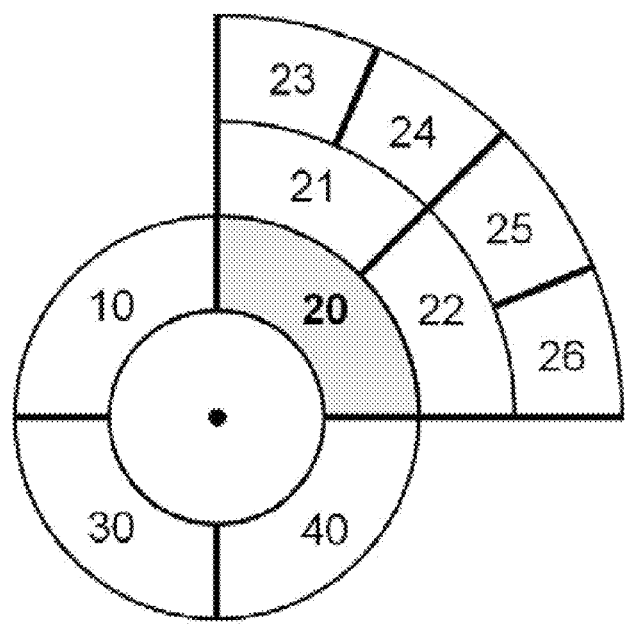
FIG. 6 illustrates an embodiment of the concentric menu with a pie slice shaped sub-menu, wherein the active menu item is highlighted.

FIG. 6 illustrates an embodiment of the concentric menu with a pie slice shaped sub-menu, wherein the active menu item 20 is highlighted. In this embodiment the user can directly see, which menu item is currently selected and which options he/she has. The activated level 1 menu item 20 can in addition be colored differently, the borders can be darkened or the selected menu item 20 can be animated to increase in size for example. In an alternative embodiment the path within the concentric menu is highlighted (FIG. 7) whereas the active menu item is highlighted differently.

To further facilitate the navigation in the concentric menu, another embodiment of the present invention further comprises the detection of the cursor over one menu item of the first grouping of menu items. Subsequently, the display of the second grouping of menu items is animated concentrically in a pie sliced shape. The user only has to activate the concentric menu with the input device and can then navigate through the several menu items just by moving the cursor over the path of the selected menu items. This allows a much faster navigation through the concentric menu. In this embodiment the user can activate the desired menu item directly via the input device.

Figure 7:
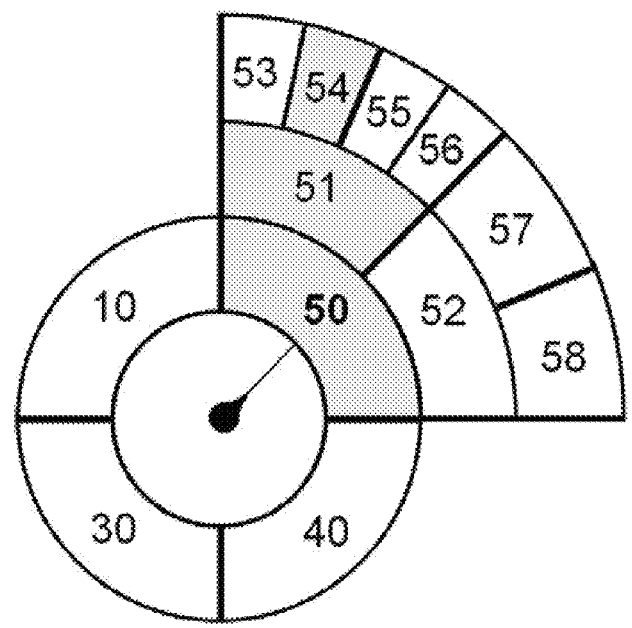
FIG. 7 illustrates an embodiment of the concentric menu with a pie slice shaped sub-menu and mixed levels of granularity.

FIG. 7 illustrates an embodiment of the concentric menu with a pie slice shaped sub-menu and mixed levels of granularity. The level 1 menu item 50 forms a hierarchical relationship with the level 2 menu items 51 and 52. The series of nested level 3 menu items 53, 54, 55 and 56 are formed in a hierarchical relationship with the menu item 51. These mixed levels of granularity allow a greater variation within the concentric menu, since various combinations of different menu items are possible. Nevertheless it is important that sub-menus do not extend over the activated circular sector, to allow intuitive navigation through the concentric menu without having to move the cursor backwards out of the circular sector. FIG. 7 further demonstrates the display of the path, as navigated through the concentric menu. It illustrates that after activation of the level 1 menu item 50, the level 2 menu item 51 and finally, the level 3 menu item 54 was selected by a user.

Figure 8:
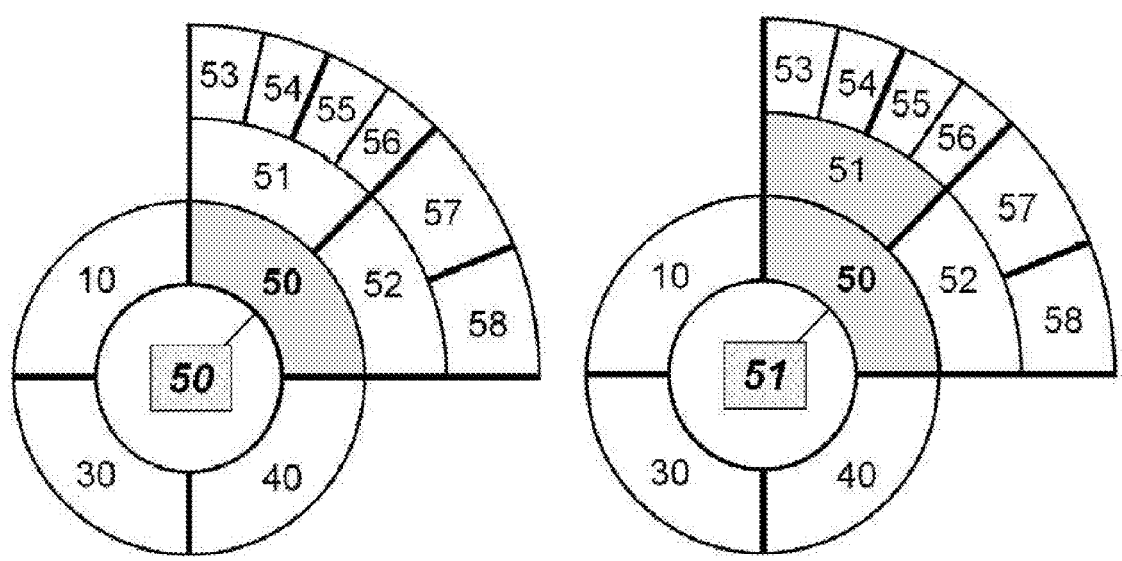
FIG. 8 illustrates an embodiment of the concentric menu with a pie slice shaped sub-menu, wherein the content of the activated menu item is displayed in the central position of the graphical user interface.

In a further embodiment of the present invention, the description of the active menu item is displayed in a central position of the GUI, as depicted in FIG. 8. When the concentric menu shows increased levels of granularity in the sub-menus, the labeling of the menu item is decreasing in size. Therefore, a larger display of the selected menu item in the central position of the GUI enables the user to verify, if the desired menu item was selected correctly. In this embodiment, the level 1 menu item 50 is selected and displayed in the central position of the GUI. After this, the level 2 menu item 51 is selected and displayed in the same position on the GUI. This display in the central position of the GUI can also be animated to appear slowly and to fade away. In addition, this central item can change its color, depending on, which level of the concentric menu is currently selected.

In an alternative embodiment of the present method of providing a GUI, the concentric menu disappears, when the cursor moves farther than a certain distance from the concentric menu. Alternatively, the GUI can be deactivated after a certain time, when it has not been used. This enables the user to use the whole display area without being distracted by the concentric menu, when it is not needed. The disabled menu can be reactivated using the input device. Alternatively, the distance of the cursor to the concentric menu is detected; and the display of the concentric menu is animated when the cursor approaches the concentric menu. This allows for a quick activation and deactivation of the concentric menu when it is needed.

Figure 9:
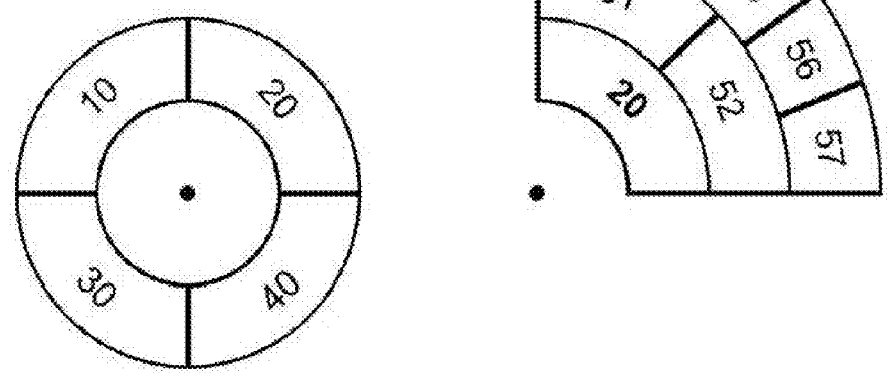
FIG. 9 illustrates an embodiment of the concentric menu with a pie slice shaped sub-menu and radially oriented labeling of the menu items.

The concentric menu can be navigated with various input devices, such as a mouse, a trackball, or a data tablet or a touchscreen. The data represented by the menu items are selected from the group consisting of letters, numerals, alphanumerics, visual images, colors and audio sounds. The data represented by the menu items can be arranged in any orientation. The text or icons can be horizontally arranged as depicted in FIG. 1 to FIG. 8, or alternatively radially oriented as depicted in FIG. 9. The lettering can moreover be curved according to the curved menu structure. The concentric menu can be implemented on any computer display and is not limited by size, shape, position on the display area, number of levels, number of menu items, number of sectors, colors, textures and animation techniques.

The invention claimed is:

1. A method of providing a graphical user interface, having a display area, the method comprising the steps of sequentially:

activating by the user via an input device at a position anywhere on the display area; animating at the position a display of a first concentric menu comprising a first pie-chart grouping of menu items comprising a subset of one or more items from a set of menu items;

after selecting one menu item out of the first grouping of menu items, animating the display of at least one additional grouping of menu items, each of the additional groupings formed concentrically around the first grouping in an additional pie array, increasing the initial size of the menu;

animating the display of a first concentric menu at any position on the display via the input device, the menu comprising a first grouping of menu items comprising a subset of one or more items from a set of menu items, after activation via the input device; and after selecting one menu item out of the first grouping of menu items, animating the display of at least one additional grouping of menu items, each of the additional groupings formed concentrically around the first grouping in an additional pie array such that the concentric menu is invisible, transparent or inactivated when the cursor moves farther than a certain distance from the concentric menu.

2. The method defined in claim 1, wherein at least one additional grouping of menu items corresponds to sub-menus of the selected menu item of the first grouping of menu items and each of the additional groupings of menu items is formed concentrically and sequentially in an additional pie array.

3. The method defined in claim 2, wherein after selection of one menu item, the unselected menu items are animated to fade away or to fade until a certain transparency is reached.

4. The method defined in claim 1, wherein the menu appears directly below or in close proximity to the actual cursor position.

5. The method defined in claim 1, wherein the first concentric menu comprising the first grouping of menu items is animated to increase in size before reaching its final state.

6. The method defined in claim 1, further comprising: detecting a cursor over one menu item of the first grouping of menu items; and animating the display of the additional grouping of menu items formed concentrically in an additional pie array.

7. The method defined in claim 1, wherein the movement of the cursor to the outer parts of the concentric menu activates the display of at least one additional level of menu items formed concentrically in an additional pie array, and every menu item can be selected via the input device.

8. The method defined in claim 1, wherein the selected menu item from the first concentric menu and at least one additional grouping of menu items from the first concentric menu are animated to form a circular sector together.

9. The method defined in claim 1, wherein the first concentric menu comprises four menu items and the selected menu item and the at least one additional grouping of menu items are animated to form a quadrant together.

10. The method defined in claim 1, wherein the number of menu items of the additional menu level is visualized in the first grouping.

11. The method defined in claim 1, wherein most frequently used menu items are placed in innermost groups within the circular sector of the concentric menu and less frequently used menu items are placed in outermost groups within the circular sector of the concentric menu.

12. The method defined in claim 1, wherein each grouping of menu items may further comprise mixed levels of granularity.

13. The method defined in claim 1, wherein the content of the activated menu item is displayed in the central position of the graphical user interface.

14. The method defined in claim 1, wherein the user is able to modify the graphical user interface.

15. A system for providing a graphical user interface, the system comprising:
a processor;
a display in communication with the processor;
an input device in communication with the processor and enabling a user to control a cursor and select menu items displayed in the display; and
a memory in communication with the processor and storing machine instructions that cause the processor to perform the steps of:
animating the display of a first concentric menu at any position on the display via the input device, the menu comprising a first grouping of menu items comprising a subset of one or more items from a set of menu items, after activation via the input device;
after selecting one menu item out of the first grouping of menu items, animating the display of at least one additional grouping of menu items, each of the additional groupings formed concentrically around the first grouping in an additional pie array;
animating the display of a first concentric menu at any position on the display via the input device, the menu comprising a first grouping of menu items comprising a subset of one or more items from a set of menu items, after activation via the input device; and
after selecting one menu item out of the first grouping of menu items, animating the display of at least one additional grouping of menu items, each of the additional groupings formed concentrically around the first grouping in an additional pie array such that the concentric menu is invisible, transparent or inactivated when the cursor moves farther than a certain distance from the concentric menu.

16. The system of claim 15, wherein the input device includes a mouse, a trackball, a data-tablet or a touchscreen.

17. The system of claim 15, wherein the data represented by the menu items are selected from the group consisting of letters, numerals, alphanumerics, visual images, colors and audio sounds and are oriented horizontally or radially.

18. The system of claim 15, wherein selectively displaying the activated menu item includes at least one of highlighting, coloring, darkening borders and animation of the selected menu item.

* * * * *